H. H. BOENKER.
AGRICULTURAL IMPLEMENT.
APPLICATION FILED MAR. 7, 1911.
1,064,045.
Patented June 10, 1913.
4 SHEETS—SHEET 4.
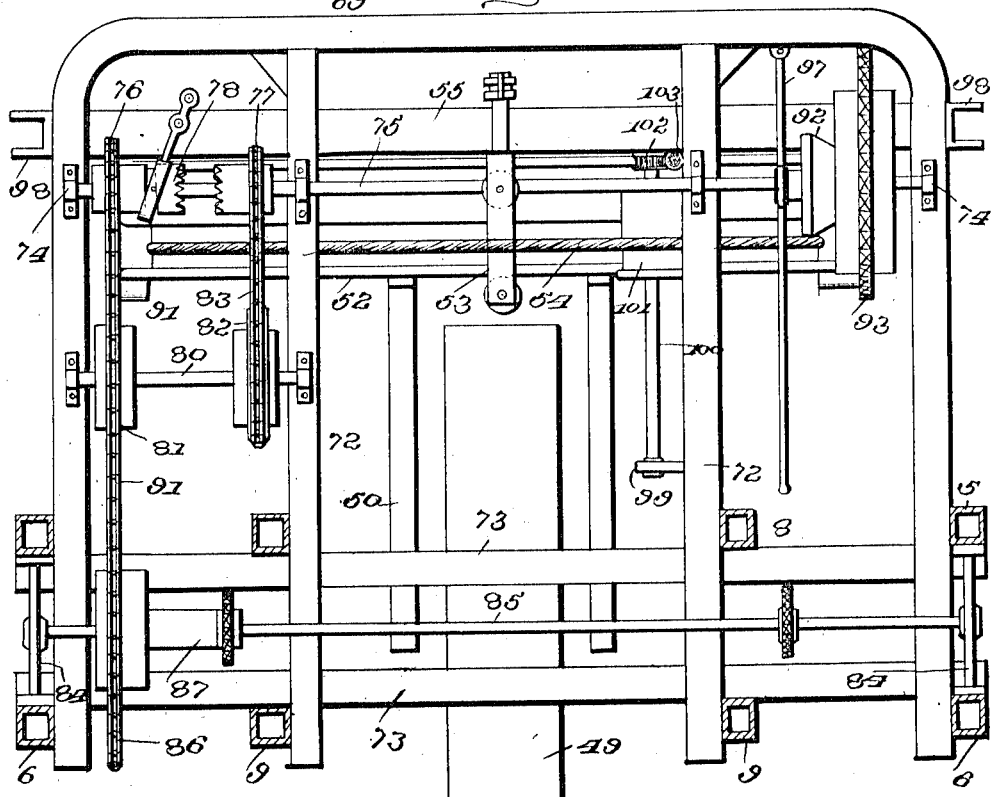
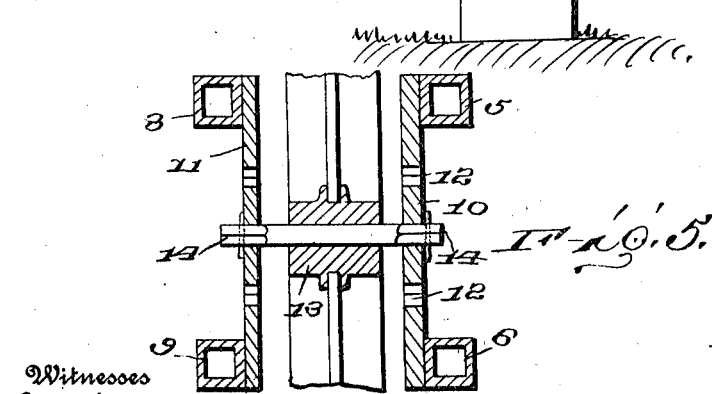

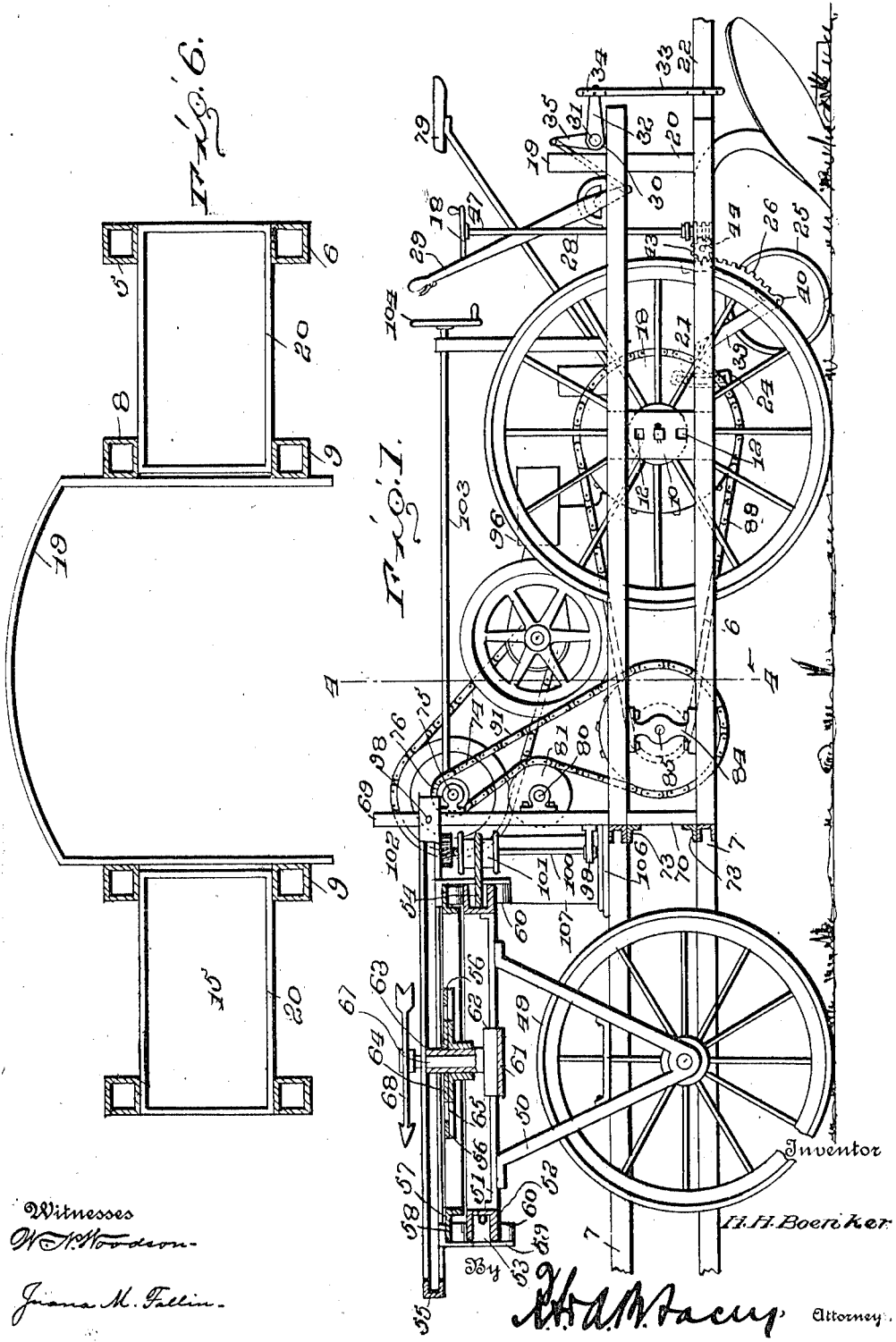

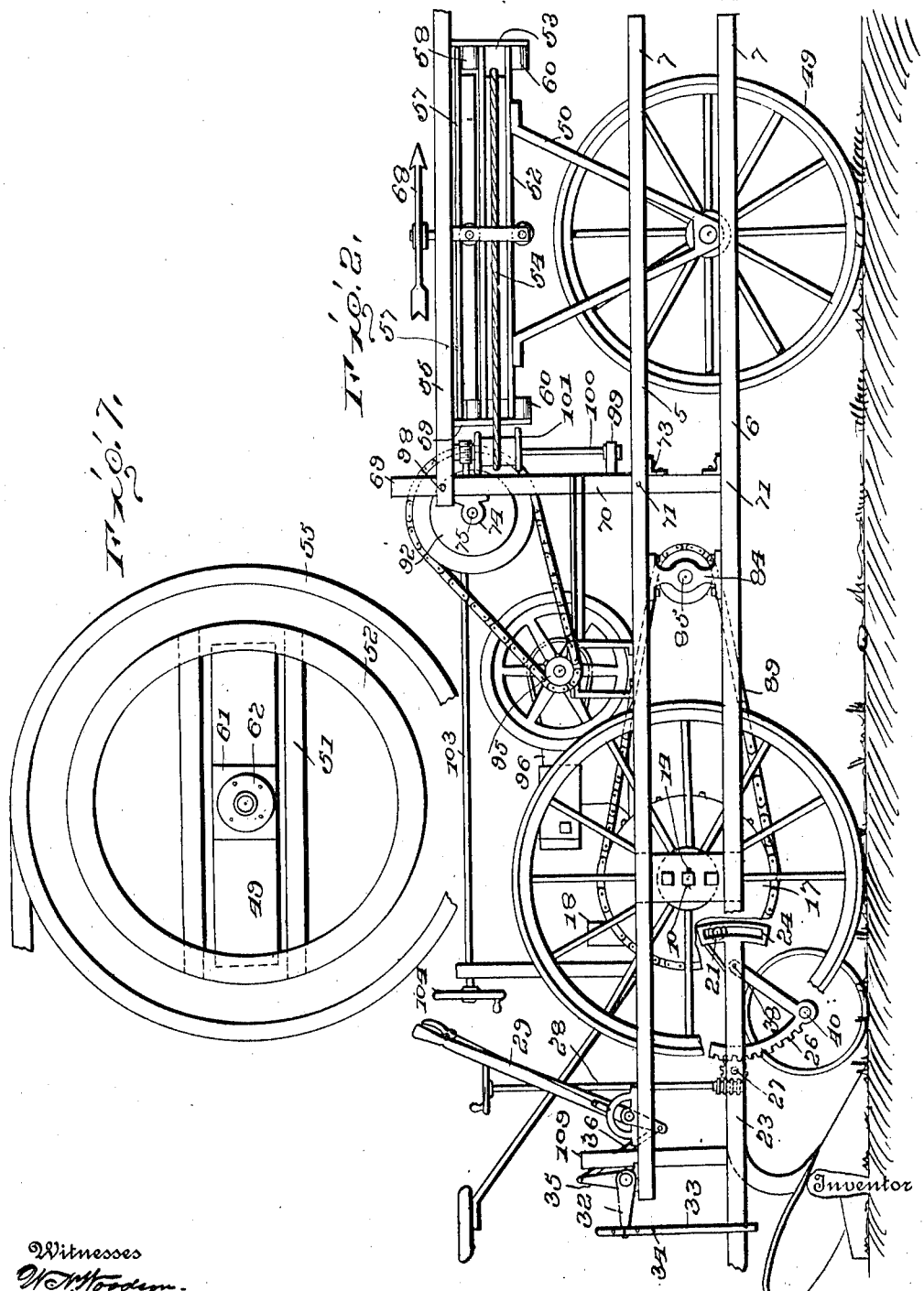

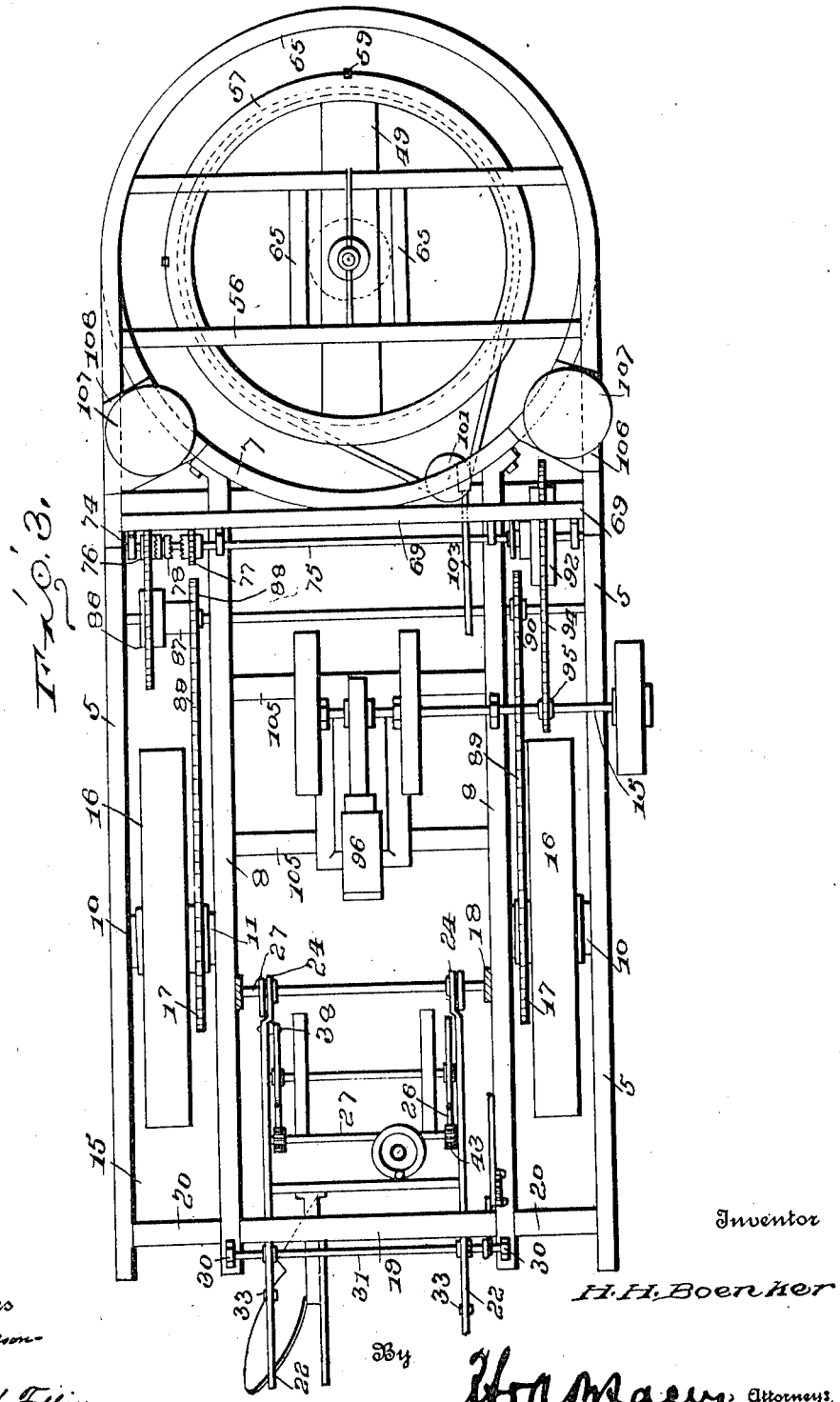

UNITED STATES PATENT OFFICE.

HENRY H. BOENKER, OF ST. CHARLES, MISSOURI.

AGRICULTURAL IMPLEMENT.

1,064,045. Specification of Letters Patent. Patented June 10, 1913.

Original application filed December 8, 1910, Serial No. 596,303. Divided and this application filed March 7, 1911. Serial No. 612,847.

*To all whom it may concern:*

Be it known that I, HENRY H. BOENKER, citizen of the United States, residing at St. Charles, in the county of St. Charles and State of Missouri, have invented certain new and useful Improvements in Agricultural Implements, of which the following is a specification.

This invention relates to agricultural machinery and more particularly to a tractor of that general class shown and described in my pending application filed in the United States Patent Office on the 8th day of December 1910, under Serial No. 596,303, and of which the present application forms a division.

The object of the invention is to provide a motor driven tractor of simple and durable construction capable of making a relatively short turn and which may be driven either forward or backward without reversing the engine.

A further object is to provide the main frame of the machine with vertically adjustable stub axles so that the traction wheels thereof may be raised or lowered independently of each other, thereby to level the machine, as for instance, when one of the traction wheels is traveling in a furrow.

A further object is to provide the main frame with an auxiliary frame or yoke which spans the movable frame of the tractor and forms a combined guide and rub iron for said movable frame.

A further object is to provide a novel form of bearing for the front wheel of the main frame or truck, and means carried by said wheel for indicating the direction of travel of the machine.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a side elevation partly in section of a tractor embodying the present invention; Fig. 2 is a side elevation looking at the other side of the machine; Fig. 3 is a top plan view; Fig. 4 is a vertical sectional view taken on the line 4—4 of Fig. 1 and looking in the direction of the arrow; Fig. 5 is a detail sectional view, showing the manner of mounting the traction wheels on the stub axle of the truck; Fig. 6 is a rear elevation, showing the construction of the rear yoke of the main frame; Fig. 7 is a top plan view of the reinforcing ring constituting the lower section of the fifth wheel.

Corresponding and like parts are referred to in the following description and indicated in all the views of the drawings by the same reference characters.

The improved tractor forming the subject matter of the present invention comprises a main frame including superposed parallel outer side bars 5 and 6 preferably formed of tubing and having their forward ends riveted or otherwise rigidly secured to annular reinforcing members or rings 7 constituting the front end of the machine.

Spaced from the outer side bars 5 and 6 are inner side bars 8 and 9 also formed of tubing and having their forward ends rigidly secured to the adjacent annular members or rings 7. The outer side bars 5 and 6 are connected by vertically disposed bearing blocks 10, there being similar bearing blocks 11 connecting the inner side bars 8 and 9, said bearing blocks being provided with a vertical row of openings 12 disposed in transverse alinement and adapted to receive stub axles, indicated at 13. The intermediate portions of the stub axles 13 are cylindrical in cross section, while the opposite ends thereof are provided with squared terminals 14 having openings formed therein for the reception of cotter pins or similar fastening devices, thereby to prevent rotation of said stub axles.

The inner and outer side bars of the main frame are spaced apart to form compartments 15 adapted to accommodate traction wheels 16, said traction wheels being loosely mounted on the stub axles and each provided with a sprocket wheel 17. It will here be noted that the traction wheels 16 are independently mounted on the stub axles, the latter being adjustable vertically of the frame so as to permit either wheel to be raised or lowered independently of the other to level the machine, as for instance, when one of the traction wheels is traveling in a furrow.

Interposed between the inner side bars 8 and 9 of the main frame, are inverted U-shaped auxiliary frames or yokes 18 and 19, the opposite legs of the yoke 18 being spaced inwardly from the rear end of the main frame and rigidly secured to the adjacent inner side bars 8 and 9, and the legs of the yoke 19 being disposed at the extreme rear end of the truck, as shown. Rigidly secured to the opposite legs of the yoke 19, are substantially rectangular connecting frames 20, which latter extend transversely across the compartments 15 and are rigidly secured to the inner and outer side bars, thus to properly space said bars and at the same time secure the several parts in assembled position. The opposite legs of the yoke 18 are formed with transversely alined openings in which is seated a transverse rod 21, the latter constituting a draw bar for the plow carrying frame, indicated at 22. The plow carrying frame 22 is of the construction shown and described in my pending application, before referred to, and comprises spaced side bars having their inner ends provided with arcuate slots 24 for the reception of the draw bar 21 and provided with depending brackets on which are journaled spaced guide wheels 25, said brackets being provided with arcuate rack bars 26, the teeth of which mesh with suitable pinions carried by a transverse shaft 27.

A staff 28 is mounted on the plow carrying frame and provided with a worm gear which engages a worm wheel on the shaft 27 so that by rotating the staff, the wheels 25 may be raised or lowered. An operating lever 29 is mounted on the main frame of the machine and coöperates with the plow carrying frame 22 so that by tilting the lever, the rear end of said plow carrying frame may be raised or lowered. The specific construction of the plow carrying frame, however, forms no part of the present invention, and is merely shown and described in order to render the operation of the machine clear.

Mounted for rotation within the rings 7, is a steering wheel 49 to the axle of which are fastened diverging hangers 50 constituting bearings for said wheel. The upper ends of the hangers 50 are secured to spaced longitudinal bars 51, the latter being in turn rigidly connected to a ring 52 constituting the lower member of a fifth wheel. The ring 52 is preferably formed of channel iron so as to produce an intermediate groove 53 for the reception of a steering rope or cable 54.

Disposed above the annular members or rings 7, is a U-shaped frame 55, the outer end of which is curved to conform to and disposed in vertical alinement with the adjacent ring 7, while the intermediate portion of the frame 55 is connected by transverse bars 56, said frame and bars constituting the top of the machine at the forward end thereof.

Secured to the transverse bars 56, is an annular member or ring 57 preferably formed of angle iron, and which constitutes the upper member of a fifth wheel. Journaled in the depending flange of the member 57, are antifriction rollers 58, which latter are also journaled in suitable bars or hangers 59 and bearing against the upper surface of the lower member 52 of the fifth wheel, thus to permit the steering wheel 49 to readily turn without undue friction between the parts.

Suitable rollers 60 are also preferably journaled in the lower ends of the bars or hangers 59 for engagement with the lower face of the member 52. Connecting the longitudinal bars 51 of the lower member 52, is a plate 61 having a disk 62 secured thereto and provided with a vertically disposed tubular member 63, there being a similar disk 64 secured to relatively short connecting bars 65 and provided with a depending flange through which the tubular member 63 passes so as to form a bearing for said tubular member. Seated in the tubular member 63, is a pin 67, the upper end of which is provided with a pointer 68 movable with the tubular member 63 for the purpose of indicating the direction of travel of the machine.

Disposed at the rear of the steering wheel 49, is an inverted substantially U-shaped frame 69 preferably formed of angle iron and having its opposite legs 70 riveted or otherwise rigidly secured to the outer side bars 5 and 6 of the main frame, as indicated at 71. The frame 69 is reinforced and strengthened by the provision of spaced bars 72, the lower ends of which bear against and are rigidly secured to the inner side bars 8 and 9 of the main frame.

One or more braces 73, preferably formed of angle iron, are secured to the bars 70 and 72 and also to the inner and outer side bars of the main frame to assist in holding the parts rigidly in assembled position. Journaled in suitable bearings 74 formed in the legs 70 and vertical bars 72, is a power shaft 75 on which are loosely mounted spaced sprocket wheels 76 and 77, there being a clutch 78 interposed between said sprocket wheels and provided with a suitable operating handle extending within convenient reach of the driver's seat, indicated at 79.

Disposed beneath the power shaft 75, is a countershaft 80, on which are keyed spaced sprocket wheels 81 and 82, the sprocket wheel 82 being connected with the wheel 77 by a sprocket chain 83. Journaled in suitable bearings 84 connecting the side bars 5 and 6 of the truck, is a transverse shaft 85 having a differential gear 86 secured thereto and provided with a sleeve 87 carrying a relatively small sprocket wheel 88, the latter being connected through the medium of a sprocket chain 89 with the sprocket wheel 17 on the adjacent traction wheel of the truck. A similar sprocket wheel 90 is secured to the opposite end of the shaft 85 and connected through the medium of a sprocket chain with the other traction wheel of the truck. Extending around the loose sprocket wheel 76, is a sprocket chain 91 which also embraces the differential gear or sprocket 86, a portion of the sprocket chain 91 being disposed in contact with the sprocket wheel 81 on the countershaft 80.

Secured to the power shaft 75 at a point opposite the sprocket wheels 76 and 77, is a friction clutch 92, of any suitable construction, said clutch being provided with a sprocket wheel 93 which engages a sprocket chain 94 connected with a sprocket wheel 95 on the driving shaft of an engine of any suitable construction, indicated at 96 so that when the lever 97 is operated to key the sprocket wheel 93 on the power shaft 75, motion will be transmitted from the engine through the medium of the power shaft 75, transverse shaft 85 and sprocket wheels 17 to propel the machine over the surface of a field or other inclosure.

When the clutch 78 is moved into engagement with the sprocket wheel 76, said sprocket wheel will exert an upward pull on the sprocket chain 91 and thus drive the machine forward over the field. When the clutch 78 is moved into engagement with the loose sprocket wheel 77 however, the sprocket wheel 81 will exert an upward pull on the adjacent portion of the chain 91 and cause the machine to travel in a rearward direction, this reversal of movement of the machine being effected without the necessity of reversing or stopping the engine. The side bars constituting the inner end of the U-shaped frame 55 preferably terminate at the vertical frame 69 and are rigidly secured thereto at 98 so as not to interfere with the engine and its associated parts.

Journaled in suitable brackets 99 secured to the frame 69, is a vertical shaft 100, to which is attached a winding drum 101 adapted to receive the steering cord or cable 54, said shaft being provided with a worm wheel 102, which meshes with a corresponding worm on an actuating rod or shaft 103. The actuating rod or shaft 103 extends rearwardly in the direction of the operator's seat 79 and is provided with a hand wheel 104 so that by rotating said hand wheel, the steering wheel 49 may be turned to the right or left to guide the machine.

The inner side bars 8 of the main frame or truck are connected by transverse bars 105, which latter form a support for the engine 96. Suitable supports 106 are also preferably secured to the inner and outer frames comprising the truck, at the front end thereof so as to support tanks 107 adapted to contain water for cooling the engine, these tanks being arranged on opposite sides of the frame, at the rear of the steering wheel so as to occupy very little space. Attention is here called to the fact that the arched frame or yoke 19 permits vertical adjustment of the plow carrying frame 22 and not only forms a guide and prevents side movement of said plow carrying frame, but also forms in effect a rub iron therefor. It will here be noted that by removing the rod or draw bar 21, the plow carrying frame 22 may be readily detached from the main supporting frame or truck so as to permit said truck to be used for other purposes.

Having thus described the invention, what is claimed as new is:

1. In a machine of the class described, a main frame comprising inner and outer sets of longitudinal side bars, traction wheels mounted on the main frame, a yoke interposed between the inner set of side bars, a draw bar carried by the yoke, a second yoke spaced from the first mentioned yoke, a motor, and means for transmitting motion from the motor to the traction wheels.

2. In a machine of the class described, a main frame including inner and outer sets of longitudinal side bars, spacing members secured to the side bars of each set and provided with a series of vertical openings, stud axles seated in said openings, and traction wheels mounted for rotation on the stub axles and adjustable vertically of the main frame.

3. In a machine of the class described, a main frame comprising inner and outer sets of longitudinal side bars, bearing blocks secured to the side bars of each set and having vertical rows of openings formed therein, stub axles seated in said openings, traction wheels loosely mounted on the stub axles, a yoke interposed between the inner set of side bars, a draw bar carried by the yoke, a second yoke spaced from the first mentioned yoke, a motor, and means for transmitting motion from the motor to the traction wheels.

4. In a machine of the class described, a main frame including inner and outer sets of longitudinal side bars, a vertical frame secured to the side bars, a substantially U-shaped horizontally disposed frame secured to the vertical frame, a draw bar arranged at the rear of the main frame, traction wheels mounted on the main frame, a motor, a train of gearing mounted on the vertical frame and operatively connected with the motor, and means for transmitting motion from the train of gearing to the traction wheels.

5. In a machine of the class described, a main frame having traction wheels mounted thereon, a vertical frame secured to the main frame, a power shaft journaled in the vertical frame and provided with loose sprocket wheels, a counter shaft disposed beneath the power shaft and provided with fixed sprocket wheels, a transverse shaft mounted on the main frame and operatively connected with the traction wheels, a large sprocket wheel secured to the transverse shaft, a sprocket chain extending around one of the loose sprocket wheels on the power shaft and one of the sprocket wheels on the counter shaft and engaging said large sprocket wheel, a clutch interposed between the loose sprocket wheels and movable into engagement with either of said sprocket wheels for keying the latter to the power shaft, a motor, and means for transmitting motion from the motor to the power shaft.

6. In a machine of the class described, a main frame, traction wheels journaled on the main frame, a vertical frame secured to the main frame, a power shaft journaled in the vertical frame and provided with spaced sprocket wheels loosely mounted thereon, a countershaft having spaced sprocket wheels fixed thereto, a transverse shaft mounted on the main frame and operatively connected with the traction wheels, a relatively large sprocket wheel secured to said transverse shaft, a sprocket chain connecting one of the loose sprocket wheels on the power shaft and the adjacent fixed sprocket on the countershaft, a second sprocket chain extending around the other loose sprocket wheel and the adjacent fixed sprocket wheel on the countershaft and engaging the large sprocket wheel on the transverse shaft, a clutch interposed between the loose sprocket wheels for keying either sprocket wheel to the power shaft, a motor, and means for transmitting motion from the motor to the power shaft.

7. In a machine of the class described, a main frame including superposed outer side bars and superposed inner side bars spaced apart to form intermediate compartments, traction wheels mounted for rotation within said compartments, an inverted U-shaped frame connecting the inner side bars and having transversely alined openings therein, a rod seated in said openings and constituting a draw bar, a second U-shaped frame secured to the inner side bars of the main frame, a motor, and means for transmitting motion from the motor to the traction wheels.

8. In a machine of the class described, a main frame including superposed outer side bars and superposed inner side bars spaced apart to form intermediate compartments, bearing blocks connecting the inner and outer side bars and provided with spaced perforations, stub axles seated in said perforations, traction wheels disposed within the compartments and loosely mounted for rotation on the stub axles, a draw bar carried by and extending transversely of the main frame, a motor, and means for transmitting motion from the motor to the traction wheels.

9. In a machine of the class described, a main frame including inner and outer sets of superposed longitudinal side bars having their forward ends curved and united, a vertical frame extending transversely of the main frame and secured to the side bars, a U-shaped horizontally disposed frame arranged above the curved portions of the side bars and also secured to the vertical frame, a steering wheel arranged within the curved connected portions of the side bars below said horizontal frame, traction wheels mounted on the main frame, a train of gearing mounted on the vertical frame and operatively connected with the traction wheels, and a motor operatively connected with the train of gearing.

10. In a machine of the class described, a main frame including superposed inner and outer longitudinal bars, spaced yokes secured to the inner longitudinal bars, a draw bar mounted on one of the yokes, vertically adjustable stub axles mounted on the main frame, traction wheels loosely mounted on the stub axles, braces connecting the inner longitudinal bars, a motor resting on said braces, and means for transmitting motion from the motor to the traction wheels.

11. In a machine of the class described, a main frame, traction wheels arranged at the rear end of the frame, a steering wheel mounted on the front of the frame, spaced yokes mounted on the rear of the frame and arranged one in advance of the other, there being transversely alined openings formed in one of the yokes, and a draw bar extending transversely of the frame and mounted in the openings of said yoke.

In testimony whereof, I affix my signature in presence of two witnesses.

HENRY H. BOENKER. [L. S.]

Witnesses:
J. H. WERNER, Jr.,
J. C. WILLBRAND.